United States Patent [19]

Levine et al.

[11] Patent Number: 4,953,975

[45] Date of Patent: Sep. 4, 1990

[54] CORRECTION OF MATERIAL LAYER VOLUME MEASUREMENTS

[76] Inventors: Robert A. Levine, 31 Pilgrim La., Guilford, Conn. 06437; Stephen C. Wardlaw, 191 N. Cove Rd., Old Saybrook, Conn. 06475

[21] Appl. No.: 303,125

[22] Filed: Jan. 30, 1989

[51] Int. Cl.[5] .................... G01N 21/07

[52] U.S. Cl. .................... 356/246; 73/61.1 R

[58] Field of Search .................... 356/39, 246; 73/61.1 R; 128/771

[56] References Cited

U.S. PATENT DOCUMENTS

| | | | |
|---|---|---|---|
| 3,492,396 | 1/1970 | Dalton et al. | 356/39 X |
| 4,027,660 | 6/1977 | Wardlaw et al. | 128/771 X |
| 4,082,085 | 4/1978 | Wardlaw et al. | 73/61.1 R |
| 4,137,755 | 2/1979 | Wardlaw et al. | 73/61.1 R |
| 4,558,947 | 12/1985 | Wardlaw | 356/39 |
| 4,683,579 | 7/1987 | Wardlaw | 356/39 |
| 4,774,965 | 10/1988 | Rodriguez et al. | 73/61.1 R |

*Primary Examiner*—Davis L. Willis
*Assistant Examiner*—Matthew W. Koren
*Attorney, Agent, or Firm*—William W. Jones

[57] ABSTRACT

Centrifuged material layer volume measurements are made in a transparent capillary tube containing an elongated float which expands the layers being measured. The extent of layer expansion will vary depending on the tube bore diameter and the float diameter. The tube bore diameter and float diameter for each tube/float pair are measured, and an indication of the difference between the two is marked on the tube. When the volume determinations are made, the measured difference between the tube bore diameter and the float diameter is taken into account before calculating actual layer volume malues.

8 Claims, 1 Drawing Sheet

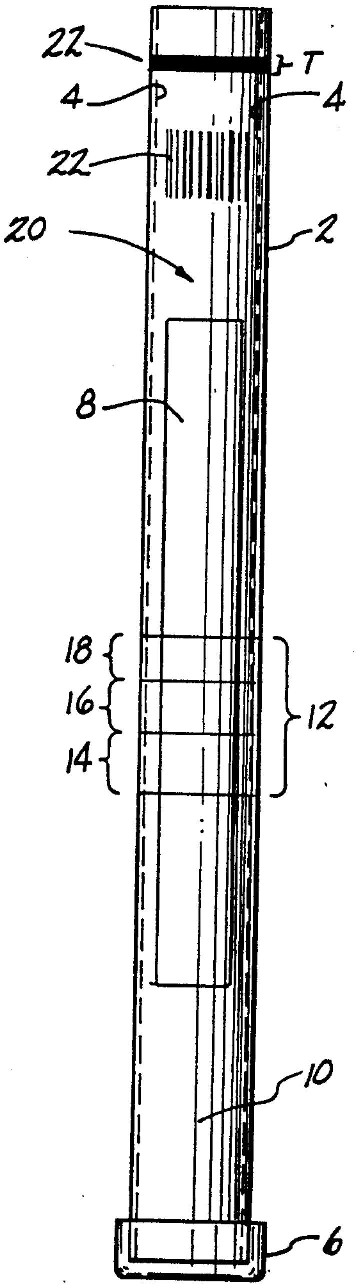
22
T
4
4
22
20
2
8
18
16
12
14
10
6

CORRECTION OF MATERIAL LAYER VOLUME MEASUREMENTS

This invention relates to a method and paraphenalia for determining material layer volume values in a centrifuged sample of a material such as blood, which is contained in a transparent capillary tube also containing a layer-elongating generally cylindrical float. More particularly, this invention relates to the correction of variations in layer volumes which result from variations in the tube bore diameter and float diameter from tube/float to tube/float.

A technique has been developed to measure constituent layers in a complex material mixture by centrifuging a sample of the material mixture in a capillary or other tube which contains a float. The float is preferably cylindrical and of a specific gravity which causes it to settle into the centrifuged mixture to a degree which creates a free volume annulus in the tube into which the layer, or layers to be measured will settle. The layers to be measured are thus physically elongated, and can be more easily and accurately measured. This technique is described in U.S. Pat. Nos. 4,027,660, issued June 7, 1977; 4,082,085 issued Apr. 4, 1978; 4,156,570 issued May 29, 1979; and others.

This technique, as described in the prior art, depends on the manufacturer's ability to hold the capillary tube ID's and the float OD's to very tight tolerances. The magnification factor for the elongated constituent layers, when the technique is used as preferred in its commercial form for measurements of blood cell counts, is about 10.5. This means that any layer which is expanded by the technique will be 10.5 times longer using the float than it would be without using the float. In order to achieve this magnitude of elongation, the tube ID will be mintained at 0.06605 inch, and the float OD will be maintained at 0.06285 inch. Thus the annulus is preferably only 0.00160 inch thick. It will be appreciated that minor variations in either the tube ID of the float OD, especially if additive, can result in changes in the annulus thickness which can cause inaccurate readings. For example, a tube ID which is slightly oversize, i.e. 0.00016 inch too large, plus a slightly undersized float, i.e. 0.00011 too small, will result in a reduction of the observed band lengths in the annulus of 8%.

This invention relates to a technique for correcting for dimensional variations in the tube and float which, if not corrected, will result in erroneous material layer volume measurements. According to this invention each tube is paired with a specific float. The tube bore diameter is actually measured, as with an air gauge or an optical instrument, or the like, and the float diameter is also actually measured, as with a micrometer, or an optical instrument. These measurements can be made optically when the float is positioned in the tube bore. Once the measurements are made, the annulus area will be determined, as well as its variation, if any, from the target area noted above. Indicia will be placed on the tube which will indicate the relationship between the target annulus area and the actual measured (or calculated) annulus area. The indicia can be a simple circumferential line or band placed on the tube, whose width can be measured by the instrument. The width of the band will be an indication of the area of the measured annulus, and the band width will be an additional measurement that the instrument's microprocessor will be preprogrammed to use to correct all of the cell band readings. Alternatively, the indicia can take the form of a machine readable bar code, which the instrument can sense, and use in a like manner to correct any of the cell band readings. The measurements can be made and the corrections applied in an instrument such as that disclosed in U.S. Pat. No. 4,156,570; or that disclosed in U.S. Pat. No. 4,558,947, both of which are incorporated herein by reference.

It is therefore an object of this invention to provide an improved technique for measuring centrifuged material constituent layers which technique employs means for identifying incorrect readings resulting from dimensional variations in the paraphenalia used to contain the samples.

It is a further object to provide an improved technique of the character described wherein correction indicia are formed on the tube which contains the sample being measured.

It is an additional object of this invention to provide an improved technique of the character described wherein a correction indicium is formed by a band printed on the tube, which band has a width which is proportional to the measured area of the annulus between the tube and float.

It is another object of this invention to provide an improved technique of the character described wherein a correction indicium is a machine readable code which can be read by the measuring instrument whereupon appropriate corrections can be made to the measured lengths of the constituent layers.

These and other objects and advantages will become more readily apparent from the following detailed description of a preferred embodiment of the invention when taken in conjunction with the accompanying drawing which is an enlarged elevational view of a tube and float combination adapted for measuring blood cell counts, and which incorporates correction indicia in accordance with the invention.

In the drawing, the tube 2 is a glass capillary tube for taking blood samples which is formed with a nominal target ID or bore diameter of 0.066050 inch, the tube bore being designated by the broken lines 4. The bottom of the tube 2 is closed with a cap 6 after the blood sample has been drawn into the tube 2. The float 8 is formed from a plastic material having a specific gravity which causes it to float in the red cell layer when the blood sample is centrifuged, and is formed with a nominal target OD of 0.06285 inch. After centrifugation, the buffy coat will layer out into these separate bands on top of the red cell layer 10. The buffy coat 12 will layer out into a granulocyte layer 14; a leucocyte/monocyte layer 16; and a platelet layer 18. These buffy coat constitute layers 14, 16, and 18 will be differentially colored because of a fluorescent stain which is added to the blood sample prior to centrifugation. Above the buffy coat constituents is the plasma layer 20, which is basically water. In one embodiment, the correction band is denoted by the numeral 22, and is formed as a predetermined width band printed on the tube 2. When the tube and float are at their nominal target diameters, the width T of the correction band 22 will be assigned a value of 100 in the microprocessor software. Thus, if the annulus has an area that is less than the nominal target area, then the correction band width T will be larger than the assigned 100 value. If, for example, the measured band width T is 110, then the microprocessor will know that the other true band lengths will be less than the measured band lengths. The expansion factor is proportional to the ratio of the square of the tube bore radius to the difference between the squares of the tube bore radius and the float radius. The microprocessor will be preprogrammed to perform this correction calculation for all of the measured layers. It will be appareciated that this use of a correction band which reflects variations from the norm in the annulus will result in accurate and true constituent layer measurements.

Instead of using the band 22, the tube 2 may have printed thereon a machine readable bar code 23. This bar code can be used with an automatic blood cell count measuring instrument such as is disclosed in U.S. Pat. No., 4,558,947, granted Dec. 17, 1985 to Stephen C. Wardlaw.

An example of the operation of this invention is as follows. A blood sample when run in a tube and float combination which had been formed with the target dimensions to produce an annulus of normal (0.00160 inch) thickness displayed an hematocrit of 47.0; a granulocyte count of 4.0; a lymphocyte/monocyte count of 2.0; a platelet count of 350; and a control band width or bar code value of 100.

When the same sample is run in a tube which is 0.00016 inch oversized in its bore, and a float which has an OD which is 0.00011 undersized, the following apparent counts will be made. The hematocrit count will measure 46.9; the granulocyte count will measure 3.68; the lymphocyte/monocyte count will measure 1.84; the platelet count will measure 322; and a control band width or bar code value will measure 92. In every reading the microprocessor will compare the measured control band width or bar code value to 100. Thus, the comparison between 92 and 100 is made, and the microprocessor calculates the appropriate correction factor and applies it to the cell band measurements to determine and display the true WBC constituent (and total WBC) counts as well as the platelet count. It will be noted that the hematocrit amount is not significantly altered by errant annulus dimensions because of the thickness of the RBC band, and because the float does not sink into the red blood cells to a significant extent.

It will be readily appreciated that the technique of this invention can result in a considerable relaxation of manufacturing tolerances as applied to the tube bore ID, and the float OD. The use of the pre-measured control bands or bar codes provides the user with confidence that the displayed cell counts are accurate and statistically sound Since many changes and variations of the disclosed embodiment of this invention may be used without departing from the inventive concept, it is not intended to limit the invention otherwise than as required by the appended claims.

What is claimed is:

1. A material sampling assembly comprising: a transparent tube for holding a material sampling to be separated by centrifugation; a cylindrical float for placement in the tube when the sample is centrifuged; and means printed on the tube or float which provides an indication of the ratio of the square of the tube bore radius to the difference between the squares of the tube bore radius and the float radius.

2. The assembly of claim 1 wherein said means printed on the tube or float is an indicium mark.

3. The assembly of claim 2 wherein said indicium mark is a band whose width provides said indication.

4. The assembly of claim 2 wherein said indicium mark is a machine readable bar code.

5. A blood sample cell count assembly comprising: a transparent tube for holding the blood sample; a cylindrical float for placement in the tube when the sample is centrifuged; and an indicium mark printed on the tube or float which provides an indication of the ratio of the square of the tube bore radius to the difference between the squares of the tube bore radius and the float radius.

6. The assembly of claim 5 wherein said indicium mark is a band disposed on said tube, the band having a width which provides said indicium.

7. The assembly of claim 5 wherein said indicium mark is a machine readable bar code.

8. A method for providing true blood cell counts in a centrifuged sample of blood contained in a transparent tube which also contains a cylindrical float, said method comprising the steps of:

(a) measuring lengths of bands of cells in the centrifuged sample which cells are positioned between the tube and the float;

(b) determining a first ratio of the square of the tube bore radius to the difference between the squares of the tube bore radius and the float radius by scanning a correction indicium mark printed on the tube or float;

(c) comparing said first ratio with a predetermined ratio of the square of a target tube bore radius to the difference between the squares of the target tube bore radius and a target float radius to determine a correction factor; and (d) using said correction factor to determine the true blood cell counts from measured cell band lengths.

* * * * *